(12) United States Patent  (10) Patent No.: US 8,306,659 B2
Abramson et al.  (45) Date of Patent: Nov. 6, 2012

(54) AUTONOMOUS ROBOT

(75) Inventors: Shai Abramson, Har-Halutz (IL); Ido Ikar, Netanya (IL)

(73) Assignee: F Robotics Acquisitions Ltd., Pardesia (IL)

( * ) Notice: Subject to any disclaimer, the term of this patent is extended or adjusted under 35 U.S.C. 154(b) by 1279 days.

(21) Appl. No.: 11/950,241

(22) Filed: Dec. 4, 2007

(65) Prior Publication Data

US 2008/0183349 A1  Jul. 31, 2008

Related U.S. Application Data

(60) Provisional application No. 60/873,098, filed on Dec. 6, 2006, provisional application No. 60/873,097, filed on Dec. 6, 2006.

(51) Int. Cl.
*G06F 19/00* (2011.01)

(52) U.S. Cl. ............. 700/250; 700/245; 700/25; 901/1; 318/568.12

(58) Field of Classification Search .................. 700/245, 700/250, 253, 254, 255, 256; 318/568.12, 318/580, 587; 701/23–27, 200, 207, 208, 701/300; 901/1; 15/319; 56/10.2 R, 10.2 A, 56/10.2 F See application file for complete search history.

(56) References Cited

U.S. PATENT DOCUMENTS

| 5,995,884 | A | * | 11/1999 | Allen et al. | ...................... | 701/24 |
| 6,255,793 | B1 | | 7/2001 | Peless et al. | | |
| 6,338,013 | B1 | * | 1/2002 | Ruffner | ........................... | 701/23 |
| 6,389,329 | B1 | | 5/2002 | Colens | | |
| 6,525,509 | B1 | | 2/2003 | Petersson et al. | | |
| 6,586,908 | B2 | | 7/2003 | Petersson et al. | | |
| 7,133,746 | B2 | | 11/2006 | Abramson et al. | | |
| 7,706,917 | B1 | * | 4/2010 | Chiappetta et al. | ........... | 700/245 |
| 2007/0016328 | A1 | * | 1/2007 | Ziegler et al. | .................. | 700/245 |

FOREIGN PATENT DOCUMENTS

| EP | 1058958 B1 | 9/2002 |
| EP | 1025472 B1 | 10/2002 |
| EP | 1172719 B1 | 2/2004 |
| EP | 1302147 B1 | 8/2004 |
| EP | 1047983 B1 | 3/2005 |
| EP | 1612631 A3 | 12/2006 |
| EP | 1512053 B1 | 5/2007 |
| WO | 9938237 A1 | 7/1999 |
| WO | 9959042 A1 | 11/1999 |
| WO | 0170009 A3 | 9/2001 |
| WO | 2005074362 A2 | 8/2005 |
| WO | 0170009 A3 | 9/2007 |

OTHER PUBLICATIONS

File history in related EP application Serial. No. 07122563.5 from Jun. 12, 2007 through Jun. 13, 2008, 171 pages.
File history in related EP application Serial. No. 07122563.5 from Jun. 12, 2007 through Jun. 13, 2008, 171 pgs.

* cited by examiner

*Primary Examiner* — Khoi Tran
*Assistant Examiner* — Spencer Patton
(74) *Attorney, Agent, or Firm* — Gerry J. Elman; Elman Technology Law, P.C.

(57) ABSTRACT

A method for communication between a charging station and a robot, via a pair of power lines coupled between a power supply in the charging station and a battery in the robot. In operation, the power supply is sequentially switched between a first voltage level and a second voltage level in accordance with a predetermined signal pattern. The voltage level on the power lines in the robot is monitored and correlated with a specific command to be executed by the robot.

19 Claims, 16 Drawing Sheets

US 8,306,659 B2

AUTONOMOUS ROBOT

RELATED APPLICATIONS

This U.S. Patent Application claims priority of commonly owned U.S. Provisional Patent Applications Ser. No. 60/873,098, filed Dec. 6, 2006 and U.S. Patent Application Ser. No. 60/873,097, filed Dec. 6, 2006, the disclosures of which are incorporated herein by reference.

BACKGROUND OF THE INVENTION

The present disclosure is directed to autonomous machines, such as robots. The robots may be, for example, in accordance with the robots disclosed in commonly owned U.S. Pat. No. 7,133,746 and commonly owned PCT Patent Applications Nos. WO 2001/70009 and WO 2005/074362, the disclosures of all three documents are incorporated by reference herein. The robots may also be suited for use with charging or docking stations, also disclosed in commonly owned U.S. Pat. No. 7,133,746 and commonly owned PCT Patent Application No. WO 2005/074362, and adapted for the particular robot. For example, and as disclosed below, the autonomous machine or robot is a robotic lawnmower in accordance with the robotic lawnmower disclosed in PCT Patent Application No. WO 2001/70009. The robot disclosed herein may use a perimeter wire, for example, in accordance with that described in commonly owned U.S. Pat. No. 6,255,793, the disclosure of which is incorporated by reference herein.

DETAILED DESCRIPTION

The robot disclosed herein may use a perimeter wire to serve both as a boundary and as a navigational guide. A charging station is typically installed on the perimeter wire, so that the robot can follow the wire and enter the charging station. The present robot may be designed for tasks, such as lawn mowing, vacuum cleaning, floor sweeping, snow removal, and the like. The robot disclosed herein includes control hardware, software or combinations thereof for controlling the requisite operations, in the form of processors, such as microprocessors, control hardware and firmware, and combinations thereof.

I. Bi-Directional Communication Between Robot and Charging Station

Figure 1:
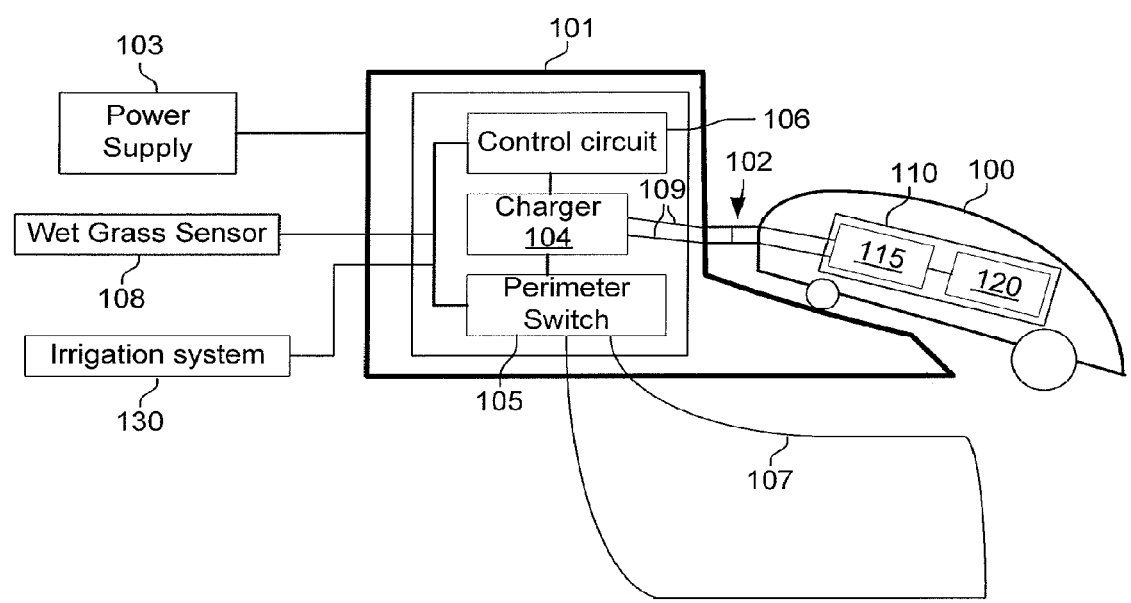
FIG. 1 is an exemplary diagram showing a robot and charging station.

FIG. 1 is an exemplary diagram showing an autonomous machine, or robot 100, and an associated charging (docking) station 101. In accordance with the present system, robot 100 and charging station 101 communicate through two power lines 109 of the charging station, through which lines the robot is charged. Power is supplied from charger 104 in charging station 101, through power lines 109, to the robot 100, via a pair of mating charging pins 102 on both charging station 101 and robot 100. As described in this section of this document, robot 100 is, for example, a robotic lawnmower. This robotic lawnmower may be for example, the robotic lawnmower disclosed in commonly owned PCT Patent Application No. WO 2001/70009, the disclosure of which is incorporated by reference herein.

As shown in FIG. 1, charging station 101 includes a physical base, charging pins 102, a power supply 103, and an electronic board, that includes, for example, a charging circuit section 104 and a perimeter switch 105, both controlled by one or more processors and associated hardware and/or firmware, such as microprocessor control circuit 106. Charging circuit section 104 drives perimeter switch 105, which applies and controls the current in one or more perimeter loops 107 which defines the operational zone for the robot 100. In addition, sensors 108, such as sensors for sensing wet or damp grass or ground, humidity, rain, can be added to the charging station. Robot 100 includes the robot electronics 110 which comprises a charging circuit 115 and a robot control circuit 120.

Communication between the robot 100 and the charging station 101 allows the robot to control a perimeter signal (a signal received by the robot that causes the robot to stay inside of perimeter wires 107) by sending commands to the charging station. In addition, this communication between the robot and the charging station enables sending control information from the charging station to the robot, such as whether the perimeter loop is broken or its overall resistance and/or inductance is too high. If the perimeter loop is too long for a given current level, for example 1000 meters rather than 500 meters, its overall resistance and inductance limits the current that can be driven into it, and the necessary current value may not be reached. In addition, such control information can include information about the grass and ground conditions, such as the grass humidity, through the wet-grass sensor 108.

Figure 2:
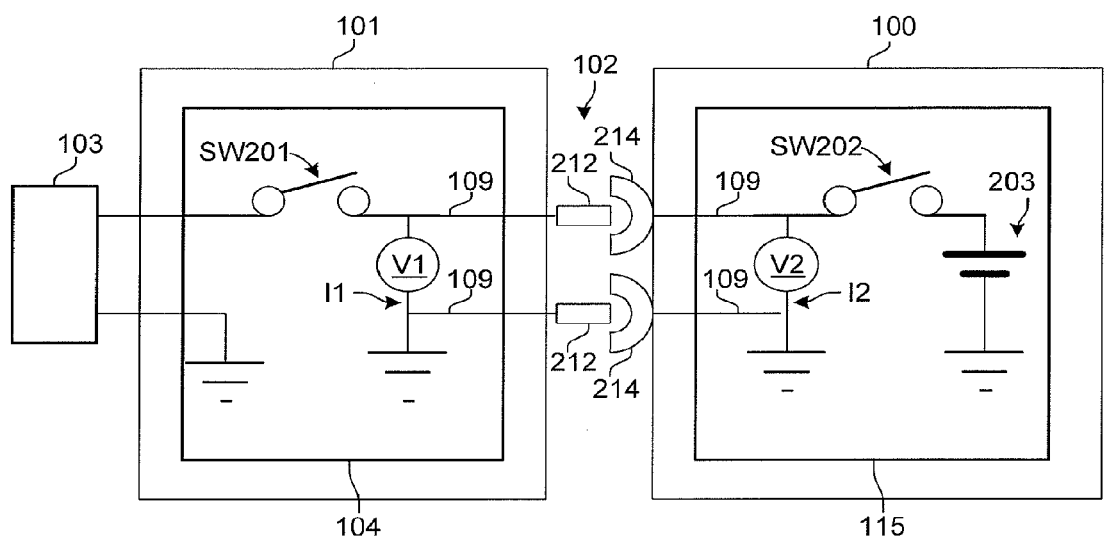
FIG. 2 is an exemplary schematic diagram showing the charging circuit in the charging station and its interconnection with the robot.

FIG. 2 schematically describes the charging circuit 104 in the charging station 101 and the charging pin mechanism 102 for interconnection with an associated robot 100. Charging station pins 212 (defining at least a portion of the aforementioned power lines 109) physically interface with robot charging receptacles 214 of the robot charging circuit 115. Battery 203 in robot 100 has a nominal voltage of, for example, approximately 24 volts, where the power supply voltage generated by the charging station is, for example, approximately 30 volts.

Switches SW 201 and SW 202 are electronic switches that are controlled by circuitry (e.g., control circuits 106 and 120) in the charging station and in the robot, respectively. When the robot 100 is connected to the charging station, both switches SW 201 and SW 202 are ON, and the robot battery 203 is charged by power supply 103. To effect bidirectional communication between charging station 101 and robot 100, power supply 103 is switched between a first voltage level and a second voltage level in accordance with one or more predetermined signal patterns. The power line voltage is monitored at shunts V1 and V2 coupled between respective sections of power lines 109 in the charging station and in the robot.

Voltage measurements at shunts V1 and V2 are fed to respective control systems which are implemented by control circuits 106 and 120 (shown in FIG. 1) in the robot and in the charging station, to effect communication there between. Alternatively, communication between charging station 101 and robot 100 may be controlled by monitoring the current at points I1 and I2 (in series with respective connecting power lines on the charging station and on the robot) and controlling the communication by switching power supply 103 in a manner analogous to the voltage monitoring/control method described below.

Robot 100 can signal the charging station 101, for example, to turn on power to perimeter switch 105 (shown in FIG. 1), or to initiate another type of transmission to the charging station. This signaling is performed by electronically turning the robot switch SW 202 OFF and ON, in accordance with various patterns, as noted above. One such pattern that may be used is, for example, a sequence of 200 milliseconds ON, followed by 200 milliseconds OFF, repeating the sequence three times. This exemplary pattern represents is a command from the robot requesting data from the charging station including information concerning perimeter loop current(s), charging station version, and grass sensor readings. In these patterns, the voltage at V1 will change according to the state of the robot charging switch SW 202. When charging switch SW 202 is ON, the charging station power supply 103 charges robot battery 115 and its voltage drops close to the battery voltage, which may be, for example, approximately 24 volts. When charging switch SW 202 is OFF, charging station power supply 103 faces only a low load, and therefore the voltage at V1 will be approximately the power supply no-load voltage (for example 35 volts, which is higher than the power supply voltage when charging the battery).

Figure 3:
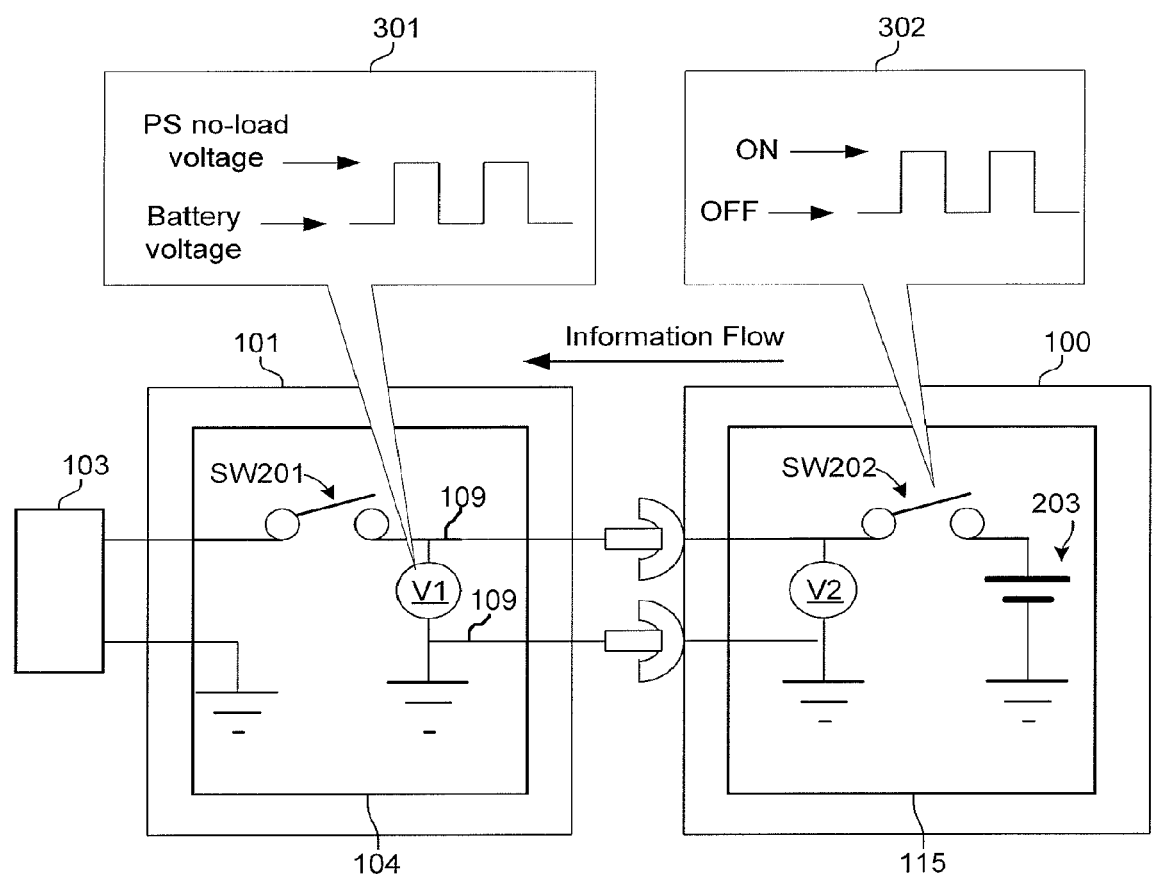
FIG. 3 is a diagram showing an exemplary sequence of signals sent from a robot to a charging station.

FIG. 3 is a diagram showing an exemplary sequence of signals sent from robot 100 to charging station 101. Callouts 301 and 302 respectively indicate the power supply no-load voltage as a function of the position of switch SW 202. By monitoring the voltage across circuit V1, the charging station can determine the robot charging switch position, and thus can recognize specific ON-OFF patterns, for example, as shown in FIG. 3. Each of these patterns is correlated with a particular command by control circuits 106 and 120 (which are shown in FIG. 1), which command is then executed by a processor in the appropriate control circuit.

Figure 4:
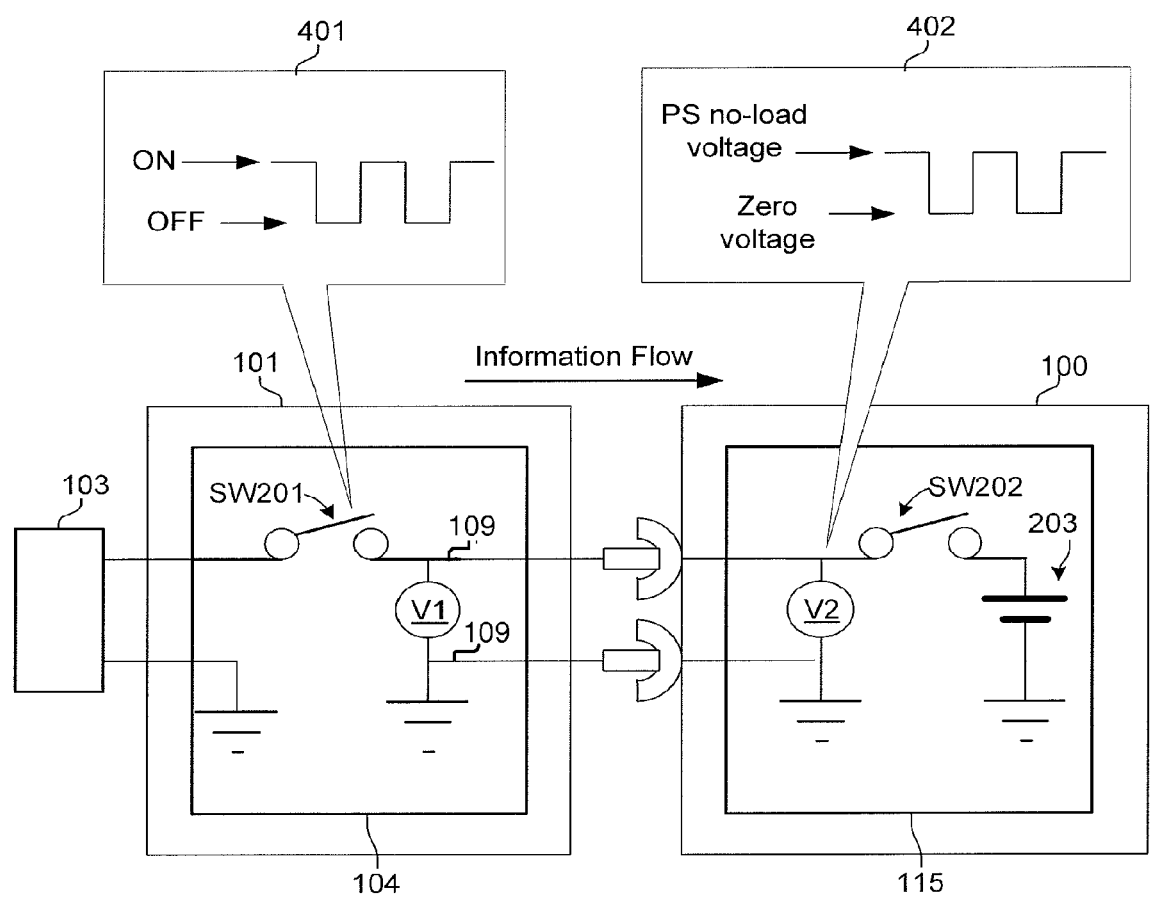
FIG. 4 is a diagram showing an exemplary sequence of signals sent from a charging station to a robot.

FIG. 4 is a diagram showing an exemplary sequence of signals sent from charging station 101 to robot 100. As shown in FIG. 4, the charging station sends information (typically as modulated discrete voltage-level signals) to the robot, by alternating switch SW 201 between the ON and OFF positions, according to the digital information to be sent from the charging station to the robot. Thus, communication between robot 100 and charging station 101 may be bi-directional. Callouts 401 and 402 respectively indicate the power supply no-load voltage as a function of the position of switch SW 201. Robot 100 turns charging switch SW 202 OFF, and monitors the voltage across V2. When charging station switch SW 201 is ON, the voltage across circuit V2 is the power supply no-load voltage, for example 35 Volts, and when switch SW 201 is OFF, the voltage across V2 varies between the power supply no-load voltage and zero, with a nominal value of 14 volts, in one embodiment.

The above described communication channel between charging station 101 and robot 100, using the existing power connections between the robot and the charging station, is also useful for sending the robot data collected from stationary sensors, such as sensor 108.

For example, as shown in FIG. 1, a wet-grass or wet-soil sensor 108, for a robotic lawn mower, can send such information. Since it may not be desirable to mow wet grass, the information from such a sensor 108 can be used in order to avoid robot operation under damp or wet grass conditions. Although robot 100 may be equipped with a rain sensor, the grass can still be wet after precipitation has ceased). Wet grass sensor 108 is electrically coupled to charging station 101 (for example, to control circuit 106), and information from sensor 108 is sent via the above-described communication method to the robot 100.

The charging station may be connected to an electronic irrigation system 130 (see FIG. 1) and thus indicate to the robot that the irrigation system is powered on (or the charging station may simply cancel scheduling the robot to operate in this situation). Robot 100 may also send other data or commands to charging station 101, including:

a. commands for activating a specific perimeter loop 107 (in the case of multiple loops);
b. commands to control the signal level on the perimeter loop (i.e., the amount of current used to drive perimeter wire 107);
c. information regarding the robot battery type and battery voltage (so that robot 100 can adapt the charging current and corresponding charging algorithm accordingly);
d. commands for controlling an electronic irrigation system 130 (such as 'clear to operate' or specific commands to turn the irrigation system on or off). Thus, the robot can replace an irrigation computer by sending commands to the charging station that will turn on/off electrical taps; and
e. commands for controlling other devices such as garden lamps, etc.

II. Scheduling System for a Robot

This section describes an exemplary process of determining an operation schedule for a robot or other autonomous machine in accordance with robot 100 detailed above, for example, a robotic lawnmower. In one embodiment, robotic lawnmower 100 is a fully automatic mode, wherein the robot's battery 203 is charged inside a charging station 101 (such as the charging station detailed above), and the robot departs to mow the lawn according to a set program (including day-of week and time-of-day data). After each operation (either due to a timeout or a low battery level), where the timeout or low battery level, for example, is in accordance with the disclosure in U.S. Pat. No. 7,133,746, the robot returns to the charging station, where it is charged until the next excursion.

The number of operations (i.e., lawn mowing sessions) during a given period of time depends on factors including the mowing capacity of the robotic lawnmower 100 (i.e., the area to be covered for a particular period of operation), the lawn area, and the type of grass (including factors such as speed in which the grass grows, and the frequency which it needs to be cut). It is desirable to program the robot to operate for only the minimum number of times that will maintain the lawn at the desired cut level. Previously, the schedule programming process required a relatively large number of input operations from the user, including inputting data such as the exact date and time of the week the robot should engage in the mowing process. Also, a user was previously required to change the scheduling program during an initial period of operation until an optimum operation schedule was determined The presently disclosed method for robot scheduling automatically determines the required scheduling data by employing at least one of the methods described below.

In one embodiment, a user enters a value indicating the area of the lawn, into a robot 100 that has been adapted to receive the programmed data. The data is received by the robot control circuit 120, which automatically sets the mowing schedule according to the average area coverage of the robot per operation (typically preprogrammed into the robot). For example, if the robot covers in average 100 square meters per operation of mowing period, the operation program can be as follows, as listed in Table 1 below. Table 1 shows, in each row, the excursion time of the robot for each day of the week:

TABLE 1

| Area | Monday | Tuesday | Wednesday | Thursday | Friday | Saturday | Sunday |
|---|---|---|---|---|---|---|---|
| 0-100 | 11:00 | | | | | | |
| 100-200 | 11:00 | 11:00 | | | | | |
| 200-300 | 11:00 | 11:00 | 11:00 | | | | |
| 300-400 | 11:00 | 11:00 | 11:00 | 11:00 | | | |
| 400-500 | 11:00 | 11:00 | 11:00 | 11:00 | 11:00 | | |
| 600-700 | 11:00 | 11:00 | 11:00 | 11:00 | 11:00 | 11:00 | |
| 700-800 | 11:00 | 11:00 | 11:00 | 11:00 | 11:00 | 11:00 | 11:00 |
| 800-900 | 11:00 22:00 | 11:00 | 11:00 | 11:00 | 11:00 | 11:00 | 11:00 |
| 900-1000 | 11:00 22:00 | 11:00 | 11:00 | 11:00 22:00 | 11:00 | 11:00 | 11:00 |

Robot 100 can learn/estimate the area of the lawn by various methods and assign numerical values to portions of the area. These numerical values are typically, for example, represented as a range between 0-1000, with ranges subdivided by hundreds, although any applicable ranges of numbers may be assigned. For example, a table such as Table 1 above is representative of programming guidelines for scheduling mowing based on the estimated lawn area.

Several methods of estimating the lawn or work area may be employed. In accordance with one method, robot 100 manually or automatically traverses the perimeter of a lawn or yard, with the path creating a polygon, and the overall area of the polygon is calculated. Numerical values are then assigned to subdivisions of the calculated overall area, where each of the subdivided areas is approximately equal in size. The maximum size of each subdivided area is a value that is either predetermined, or a function of user-entered parameters, such as average precipitation rate, desired lawn height, type of grass, and/or estimated lawn growth per unit time (e.g., average growth per week).

Alternatively, the lawn area to be mowed may be estimated according to the average leg length determined by the robot during an initial scanning operation. A leg is defined as the distance the robot travels between essentially opposite boundaries. For example, when the robot 100 reaches part of a perimeter wire 107 which is laid around the yard or lawn area, it changes direction and moves until it reaches another portion of the perimeter wire. In one embodiment, robot 100 essentially reverses its previous direction, and in another embodiment, the robot turns in place to a different angle and continues forward. A practical minimum number of legs that may be traversed to determine a suitable average leg value is, for example, 50 legs. In this method of lawn area determination, the robot is typically moving in an autonomous manner, in accordance with one of the scanning methods described in the section below.

The calculation of lawn/work area is based on the formula $A=2*L^2$ where L is the average leg length as determined, for example, by traverses of multiple legs at random angles. The random angles are, for example, as follows: when robot 100 reaches perimeter wire 107 (traversing a straight leg), the robot turns in place until its front end points back into the lawn/work area, and from there it turns in a random angle between approximately 20 and 160 degrees. In an embodiment wherein the robot is moving essentially only forward and backwards, the random angle is +/−90 degrees from the robot's current position.

The robot can further utilize electric current readings from the motors that rotate the blades during the mowing operation, for example, resulting from resistance on the blade, as detailed in commonly owned PCT Patent Application No. WO 2001/70009. If the majority of time the robot is mowing at small current loads, it indicates the robot is traversing an already cut area (because of low mowing blade resistance from the lawn), and therefore can soon return to the charging station and possibly delay or cancel the next mowing excursion, based on the determined height of the lawn. Thus, if the mowing current is detected to be less than a nominal value for more than a predetermined amount of time, the robot may inhibit one or more of the previously scheduled excursions. If a sufficient amount of the mowing operation takes place at relatively high current loads (i.e., there is relatively large lawn resistance on the blades), the robot may need to spend more time mowing the lawn. Additional operations, such as including more excursions in a weekly schedule, may be added in response to information determined during a mowing operation by robot 100.

Figure 5:
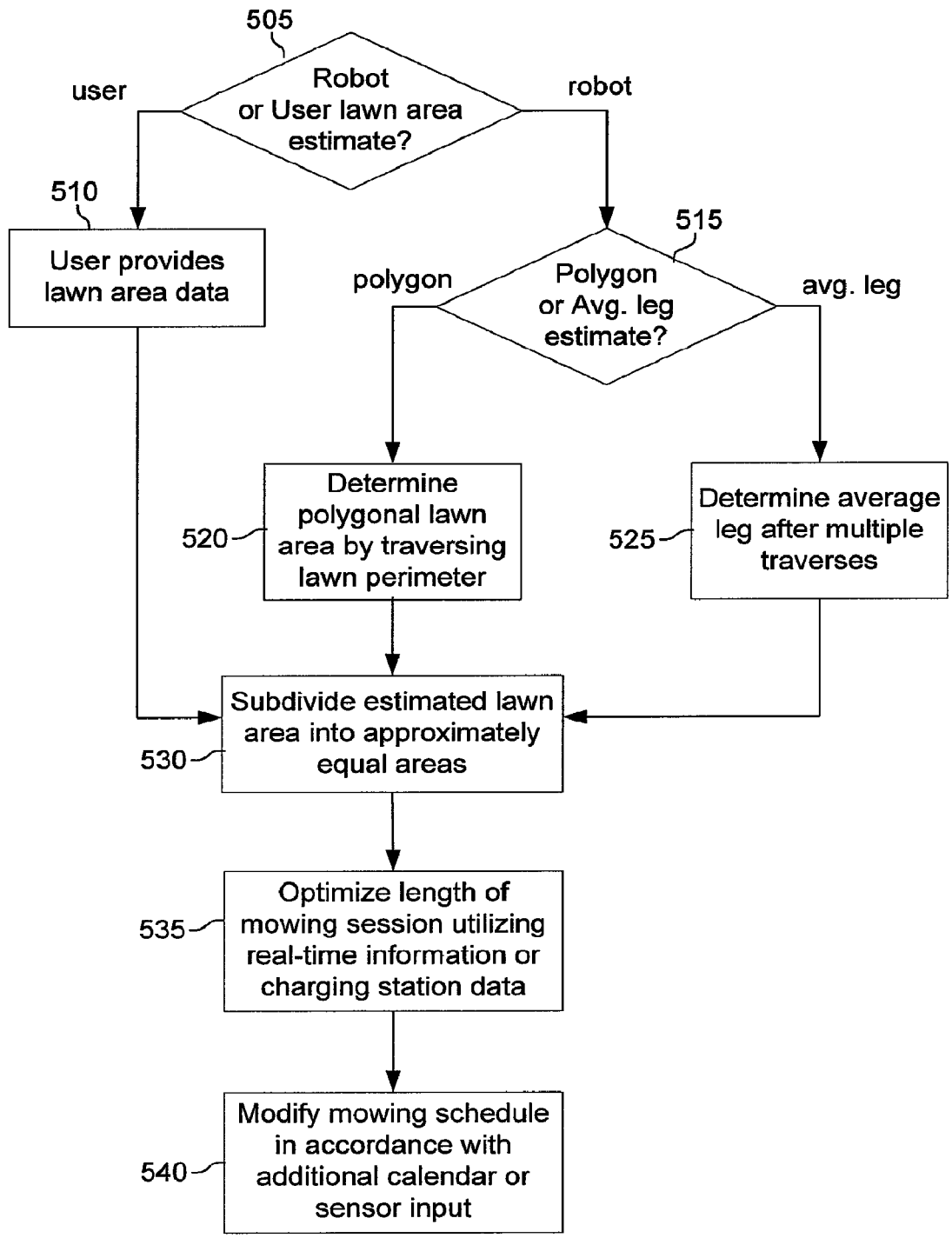
FIG. 5 is a flowchart showing an exemplary set of steps that may be performed in determining an operation schedule for a robotic lawnmower.

FIG. 5 is a flowchart showing an exemplary set of steps that may be performed in determining an operation schedule for a robotic lawnmower. As shown in FIG. 5, at step 505, an initial decision is made as to the method to be used in determining the area of the lawn to be mowed. If a manual estimate is to be used, then at step 510, the user enters an initial lawn area estimate. Alternatively, the robot determines the lawn area, and may do so using either of two methods, as determined at step 515.

In the first alternative method, at step 520, the robot estimates the lawn area by performing an autonomous scanning operation to determine a polygonal lawn area by traversing the lawn perimeter; as described above. In the second alternative method, at step 525, the robot estimates the lawn area by performing an autonomous scanning operation to determine the length of the average leg after multiple traverses of the lawn.

Next, at step 530, the estimated lawn area thus determined is subdivided into a number of approximately equal smaller areas, as described above. At step 535, during a lawn mowing operation, the robot may optimize the length of a particular scheduled mowing session by utilizing real-time information obtained during the session, or obtained from the charging station prior to the session, as described above.

At step 535, the operation schedule is determined by setting the mowing schedule according to the average area coverage of the robot per operation. That is, the mowing schedule is determined in accordance with the nominal size of an area that can be mowed by the robot in each mowing session, by dividing the determined total lawn area by the nominal area that can be mowed per session. The result is the number of mowing sessions that are required within a particular period, such as a week. These sessions can then be scheduled on a per-day basis in accordance with a chart such as that shown in Table 1.

At step 540, the robot mowing schedule may be adapted according to a calendar, such that the number of mowing excursions in a given period of time may be increased or decreased in accordance with the present date. In addition, input from environmental sensors other than, or in addition to, wet grass sensor 108 (e.g., temperature sensors, rain sensors, humidity sensors, etc.) may be used to determine whether it is a potentially a fast growing period, and adapt the robot mowing schedule accordingly.

III. Scanning Method for Area Coverage

In an exemplary embodiment, robot 100 autonomously determines a path to take when performing a particular task. Robot 100 may be a robotic lawnmower, as detailed above, or a robotic vacuum cleaner, for example, the robotic vacuum cleaner described in commonly owned U.S. Pat. No. 7,079,923, the disclosure of which is incorporated by reference herein.

Figure 6:
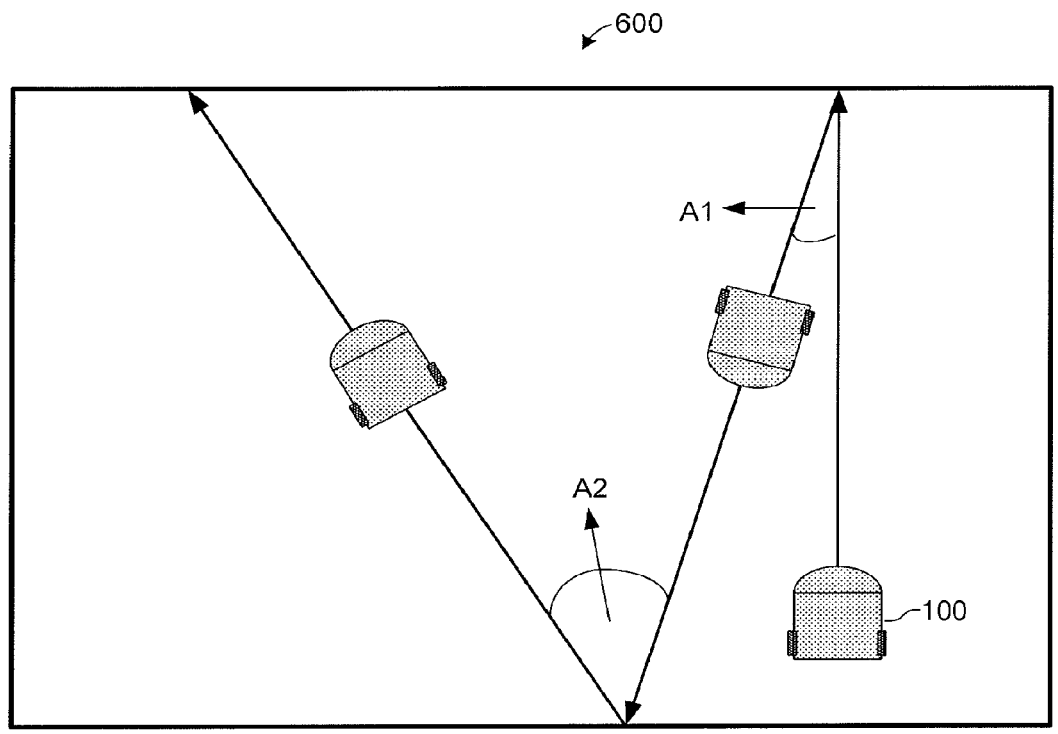
FIG. 6 is a diagram showing a prior art example of a random walk by a robot.

FIG. 6 is a diagram 600 showing an example of a prior art random walk by a robot 100 or other object, where the object makes successive random angular movements A1, A2, etc., each time the object encounters an obstacle. The simplest method of covering an area is by a random walk or random scan taken by a robot or other device, for example, as shown in FIG. 6. Elementary statistics show that on typical yards (lawns or gardens) or other work areas, such as square and rectangular shaped areas, a robot, on a random walk strategy (i.e., where an object makes successive random angular movements A1, A2, etc., each time the object encounters an obstacle), can reach an area coverage of approximately 98% of an area at about $4 \times A/(D*Vx)$, where A is the area, D is the diameter of the payload (for example the cutting blade diameter in the case of a lawnmower) and Vx is the vehicle (or robot) average velocity.

Figure 7:
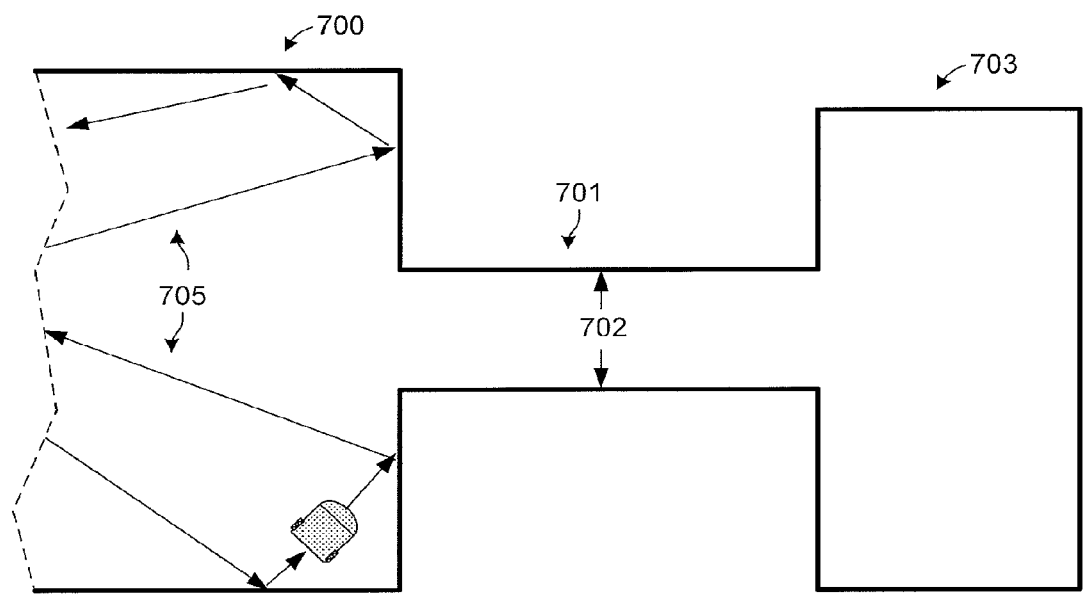
FIG. 7 is a diagram showing an example of an area such as a yard or lawn, with a narrow passage and at least one wider area.

FIG. 7 is a diagram showing an example of an area such as a yard or lawn, with at two relatively wide areas 700 and 703 and a passage 701 with a width 702 which is relatively narrow in comparison to the width of areas 700 and 703. In some yards or work areas, where there are narrow passages, for example, as shown in FIG. 7, the time to cover the entire yard (lawn) or work area is extremely long, since there is a low probability that the robot will get inside the narrow passage within a reasonable time period. Accordingly, there is typically a high probability that the robot will not get into the narrow passage 701 in a normal random walk session, as indicated by robot random path arrows 705 within wide area 700. Thus, the robot may not be able to enter the second wide area 703 within a reasonable time period. However, if the robot does move into the narrow passage 701, it may spend a relatively long time maneuvering in that area before it reaches area 703, which will thus increase the time required to cover the entire area to be mowed, i.e., areas 700, 701, and 703 in the example of FIG. 8, described below.

Figure 8:
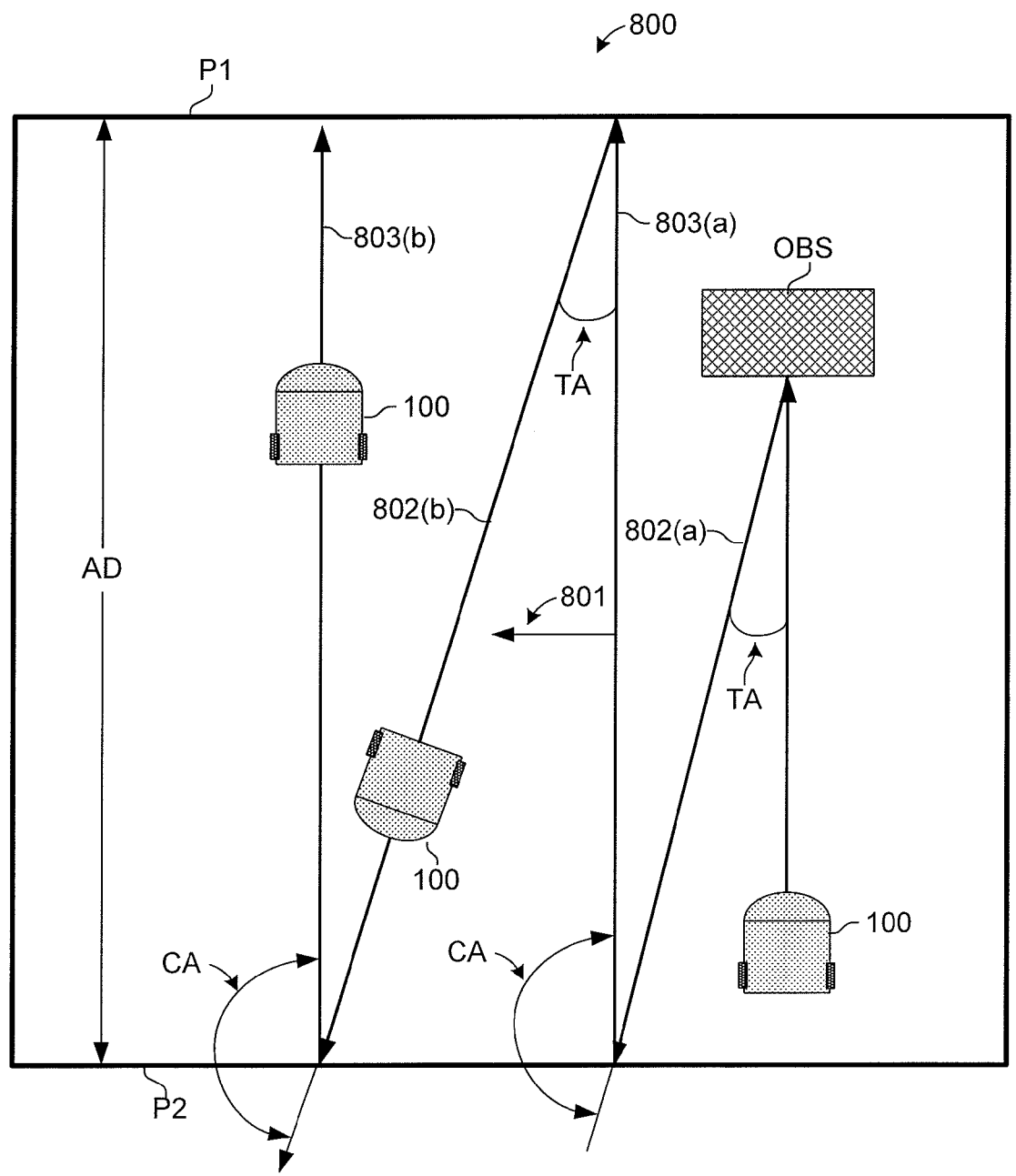
FIG. 8 is an exemplary diagram showing a method for parallel scanning of an area.

The present scanning method enhances the scanning method relative to random coverage of lawns or other work area segments by switching to parallel scanning once the robot detects it is in a narrow passage. FIG. 8 is an exemplary diagram showing a method for parallel scanning of an area 800 by a robot 100. In performing this parallel scanning method, the robot travels in a pattern comprising alternating pairs of relatively parallel lines or paths, as indicated by path pairs 802(*a*)/802(*b*) and 803(*a*)/803(*b*) in FIG. 8. As shown in FIG. 8, robot 100 travels in relatively equal lateral distances AD (the 'advancement distance'), between opposite edges P1 and P2 of the perimeter of a yard or lawn 800, which edges are relatively or substantially parallel. Another scanning pattern used by the present robot 100 may be, for example, the scanning pattern of commonly owned U.S. Pat. No. 6,615,108.

A first turn angle TA, and a second turn angle CA (which is a complementary angle relative to angle TA), each occurring at the end of every other path, are calculated according to the advancement distance AD of the path. For a parallel scan, angle AT may be any arbitrary or calculated angle, as long as a complementary turn angle CA is used on the subsequent leg. The advancement distance AD can be measured, for example, by an odometer, counting the number of revolutions a wheel on the robot turns. Turn angles TA and CA may be calculated by other types of sensors, such as a compass. A GPS (global positioning system) device may be used to determine path distance and direction where relatively large areas are to be traversed.

Figure 9A:
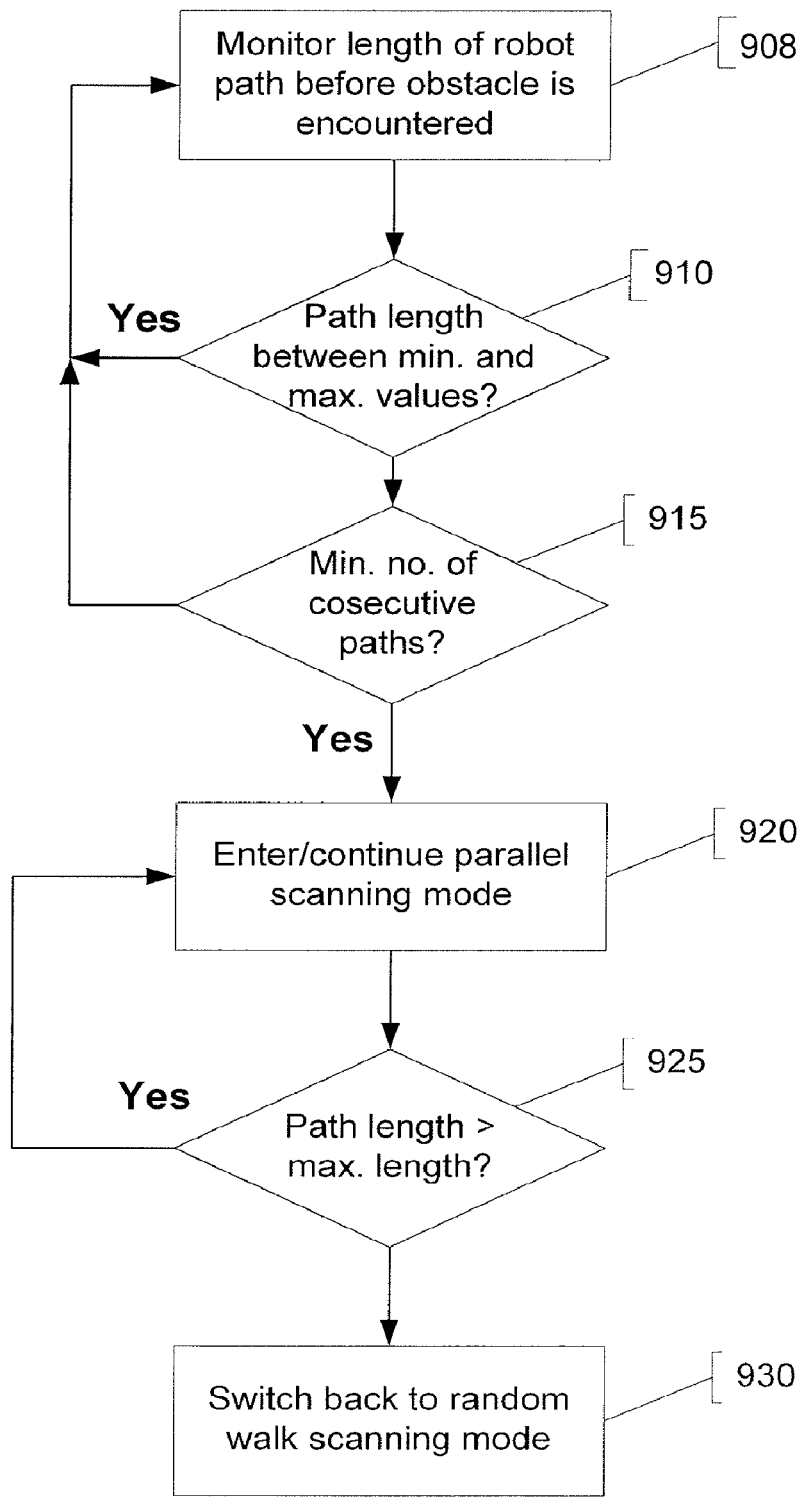
FIG. 9A is a flowchart showing an exemplary set of steps that may be performed in determining when to switch the robot scanning between random and parallel modes.

Since the present method of parallel scanning results in a significant lateral advance (in direction 801), it is useful for crossing narrow passages and reduces the time spent in narrow passages traveling between two wider areas. FIG. 9A is a flowchart showing an exemplary set of steps that may be performed in determining when to switch robot scanning between random walk and parallel scanning patterns. As shown in FIG. 9A, switching between a random walk scan and a parallel scan is initiated by monitoring the distance of each robot path (i.e., straight leg) before an obstacle is encountered, at step 908. If the path distances fall below a certain threshold (the 'narrow path maximal distance') for a predetermined minimum number of (e.g., two) consecutive paths, and are longer than another threshold (the 'narrow path minimal distance'), as indicated by steps 910 and 915, robot 100 will enter a parallel scanning pattern or mode, at step 920. Typically, two such paths are traveled before switching into parallel scanning mode. However, other numbers of consecutive paths may be used as a function of the relationship between the time it will take to detect the fact that a path is a narrow, and the probability of failing to detect narrow paths. At step 925, once the path distance has increased to more than the narrow path maximal distance, the robot switches back to random walk scanning, at step 930, having detected that the robot has crossed the narrow passage.

Exemplary values for narrow path minimal distance and narrow path maximal distance are 65 cm and 150 cm, respectively. In one embodiment, if robot 100 travels a path length in-between these minimum and maximum distances for 2 legs, a parallel scan is started. In the same embodiment, If the robot travels for more than the narrow path maximal distance for 2 legs, it switches back to random walk scanning. Other values for narrow path minimal distance and narrow path maximal distance may be determined as a function of the specific geometry of the robot, typical work area, and other factors. In certain situations, it may be necessary to traverse several legs that are longer than the narrow path minimal distance in order to reliably detect the situation before switching back to random walk mode.

If consecutive (e.g., two) paths cover less distance than the narrow path minimal distance, it is determined that the robot has reached a corner, and the robot control logic (control circuit 106), causes the robot to perform a maneuver to leave the corner. Such a maneuver may be performed in accordance with the 'rescue behavior' described in the following section.

Figure 9B:
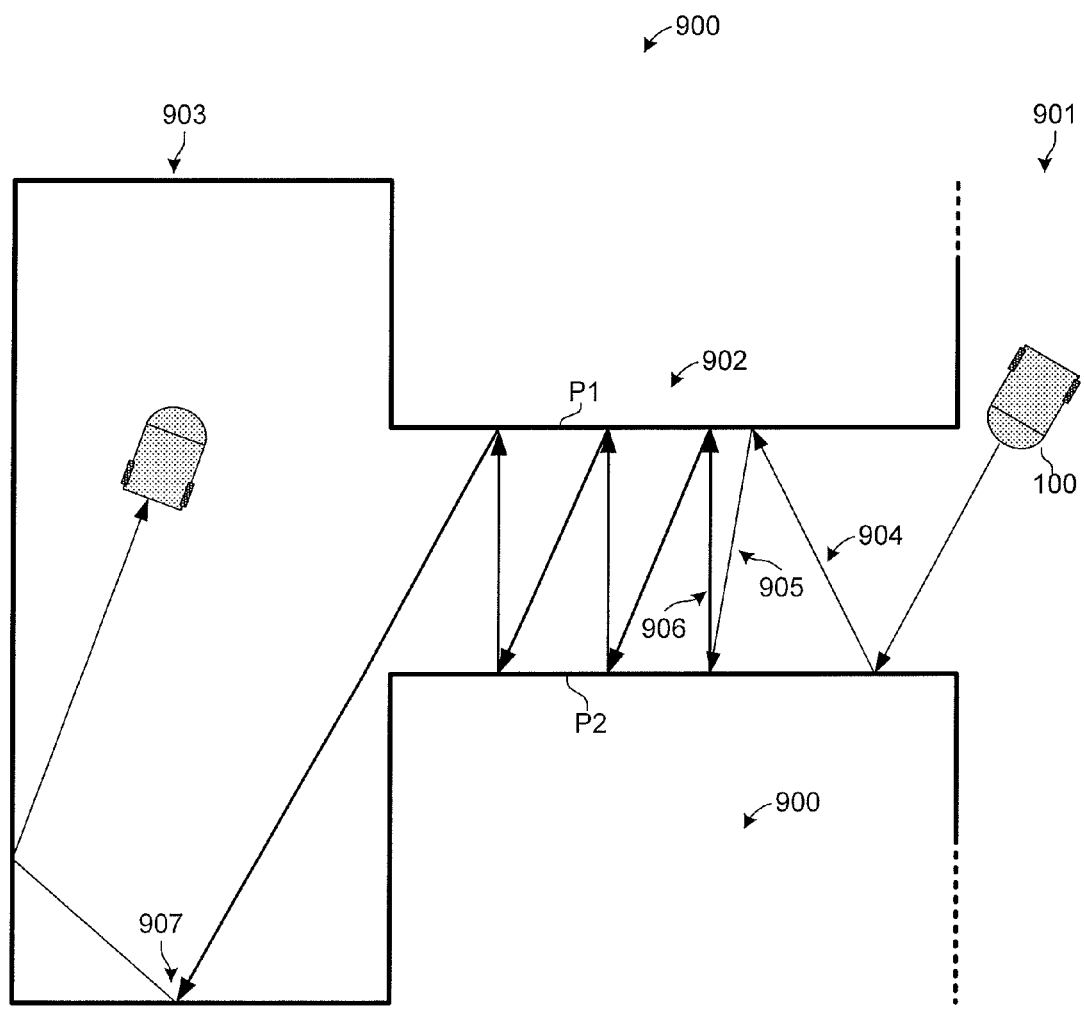
FIG. 9B is an exemplary diagram showing switching between random and parallel scans in a typical yard or work area having a narrow passage.

FIG. 9B is an exemplary diagram showing switching between random and parallel scans in a typical yard (lawn) or work area 900 having a narrow passage 902 between two wider areas 901 and 903. As shown in FIG. 9B, robot 100, initially in relatively wide area 901, enters the relatively narrow passage 902, and determines that the passage requires parallel scanning, after traversing two consecutive paths 904 and 905 that are longer than the narrow path maximal distance. Robot 100 then switches to parallel scanning mode, as described above, traveling in a pattern comprising alternating pairs of relatively parallel paths, beginning with the path indicated by line 906. This parallel scanning continues until the path distance has increased to more than the narrow path maximal distance, indicated by point 907. The robot then switches back to random walk scanning, having detected that the narrow passage has been crossed.

IV. Self-Rescue Behavior

The term 'self-rescue behavior' may be defined as the maneuvering performed by a robot 100 to extricate itself from problem areas. Self-rescue behavior is initiated by the robot when it has moved into a place from which it is difficult for the robot to extricate itself by performing normal maneuvers, such as those associated with a random walk or parallel scanning, as described in the above section.

Bisector Rescue Behavior

Bisector rescue behavior handles scenarios where the robot is temporarily immobilized in a problem area surrounded by obstacles, which prevent it from completing its desired turn movements (which can be in-place turns, pivot turns, or other types of turns, or any other movement the robot is attempting to perform. In performing bisector rescue behavior, robot 100 finds a clear sector between these obstacles and then moves through the middle of that sector (the 'bisector') to avoid contact with the obstacles.

Figure 10:
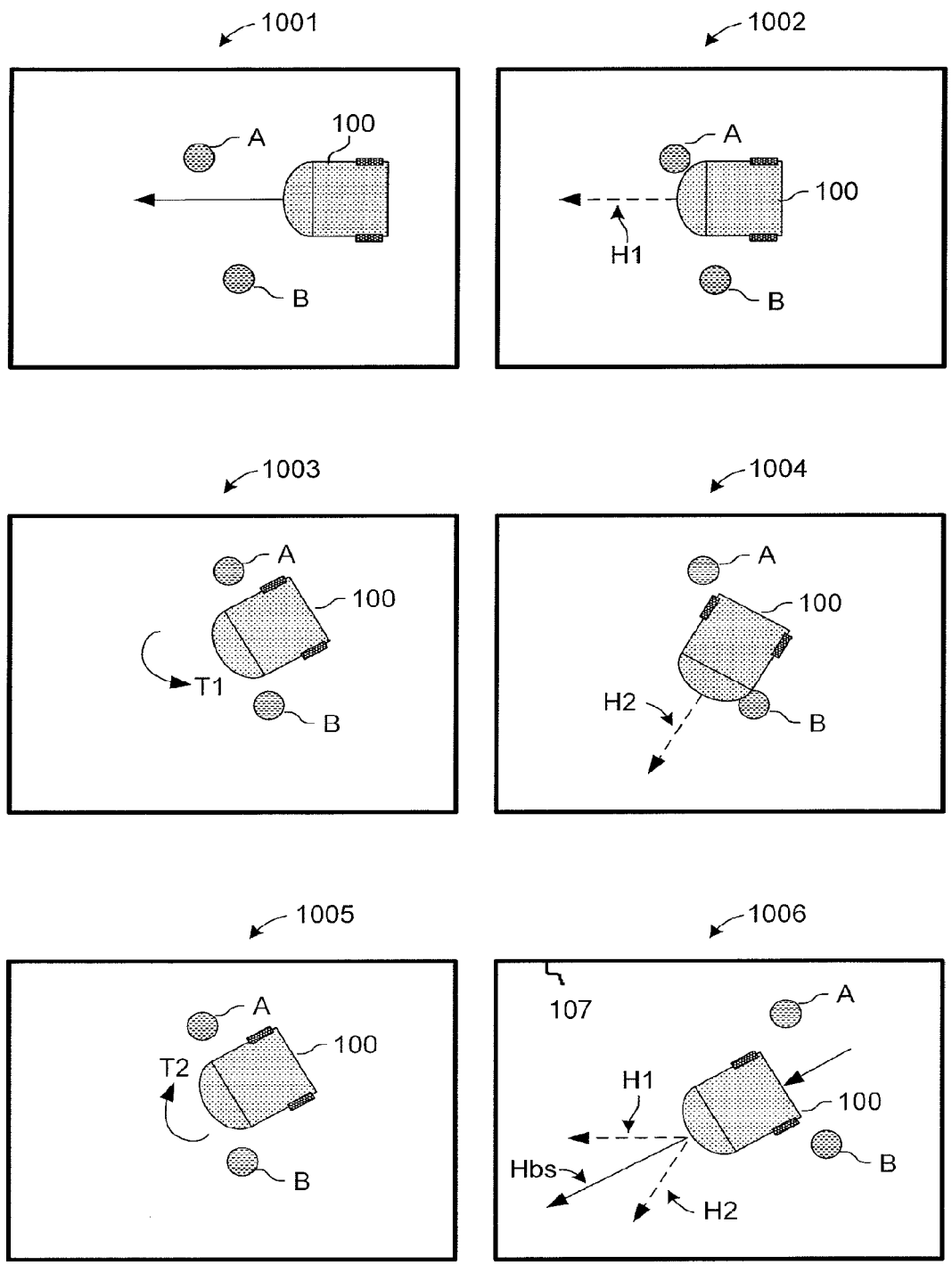
FIG. 10 is an illustrative example of bisector rescue behavior performed by a robot.
Figure 11:
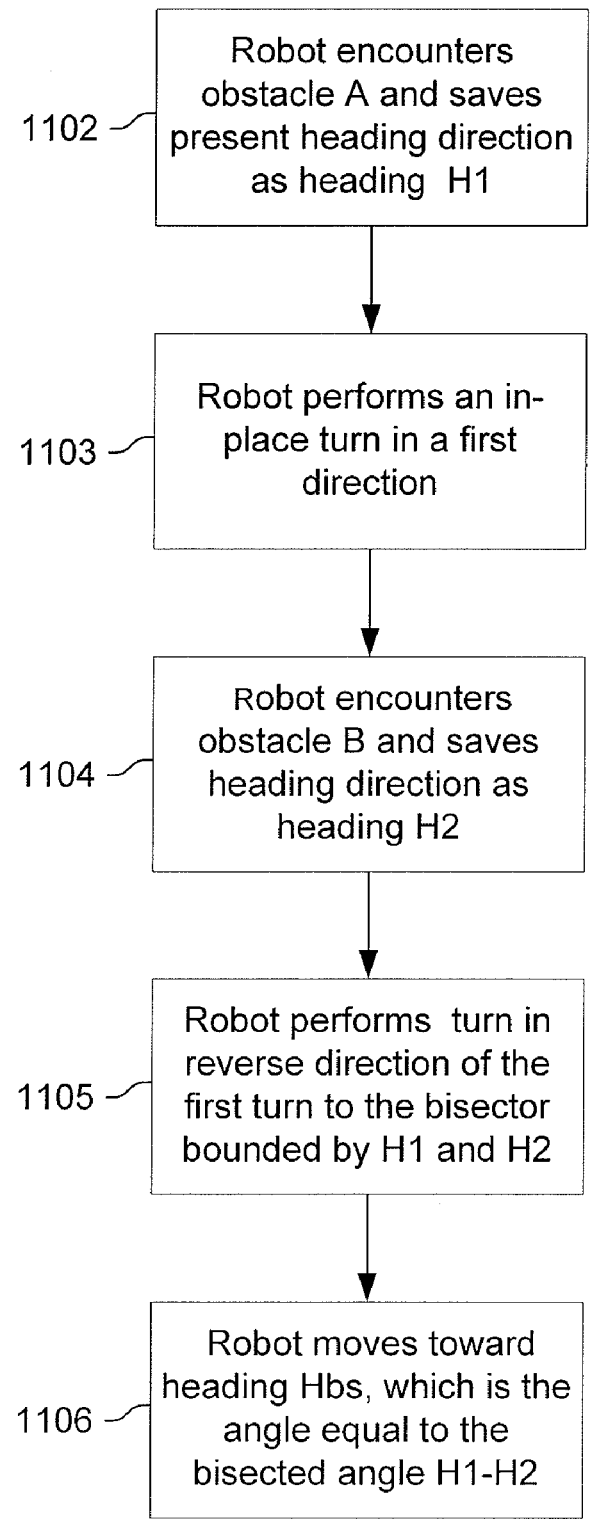
FIG. 11 is a flowchart showing an exemplary set of steps that may be performed by a robot executing bisector rescue behavior.

FIG. 10 is an illustrative example of bisector rescue behavior performed by a robot 100. In FIG. 10, objects A and B represent obstacles in a work area (e.g., lawn) surrounded by a perimeter wire 107. FIG. 11 is a flowchart showing an exemplary set of steps that may be performed by a robot 100 executing bisector rescue behavior. Operation of the present system is best understood by viewing FIGS. 10 and 11 in conjunction with one another.

As shown in FIG. 10, in diagram 1001, robot 100 is performing a forward leg towards a problem area represented by obstacles A and B. As shown in FIGS. 10 and 11, at step 1102 (and in diagram 1002), robot 100 encounters obstacle A and saves its present heading direction as heading H1. At step 1103 (diagram 1003), the robot performs an in-place turn in a first direction T1 (counter-clockwise as seen from above, in the present example) in an attempt to avoid encountering the obstacle. It should be noted that the turn directions used in this and in the following examples may be reversed; that is, clockwise turns may be substituted for counter-clockwise turns, and vice-versa, as long as the entire sequence of directional movement is reversed in a consistent manner.

At step 1104 (diagram 1004), the robot encounters obstacle B and saves the heading direction when this obstacle was encountered as heading H2. At step 1105 (diagram 1005), the robot performs a turn in the reverse direction T2 of the first turn (clockwise as seen from above, in the present example) to the bisector of the sector bounded by headings H1 and H2. At step 1106 (diagram 1006), the robot continues its operation with a forward leg, moving between obstacles A and B, in direction Hbs, which is a heading whose angular direction is equal to the bisected angle H1-H2.

It should be noted that the obstacles which create the sector used in bisector rescue behavior do not have to be solid objects, meaning that even virtual obstacles such as the perimeter wire surrounding the work area, for example, act as obstacles with respect to this behavior. Therefore, assuming that there is sufficient space between the obstacles, bisector rescue behavior can be used to find a navigable path between two solid obstacles, one solid obstacle and the perimeter wire or other combination of obstacle types.

Wire-Following Rescue Behavior

Wire-following rescue behavior handles scenarios where a robot 100 has moved into a problem area partially surrounded by obstacles and the perimeter wire 107, where the obstacles prevent the robot from getting to the rest of the work area (e.g., lawn). In executing wire-following behavior, a robot 100 follows perimeter wire 107, which should eventually lead the robot out of the problem area.

Figure 12:
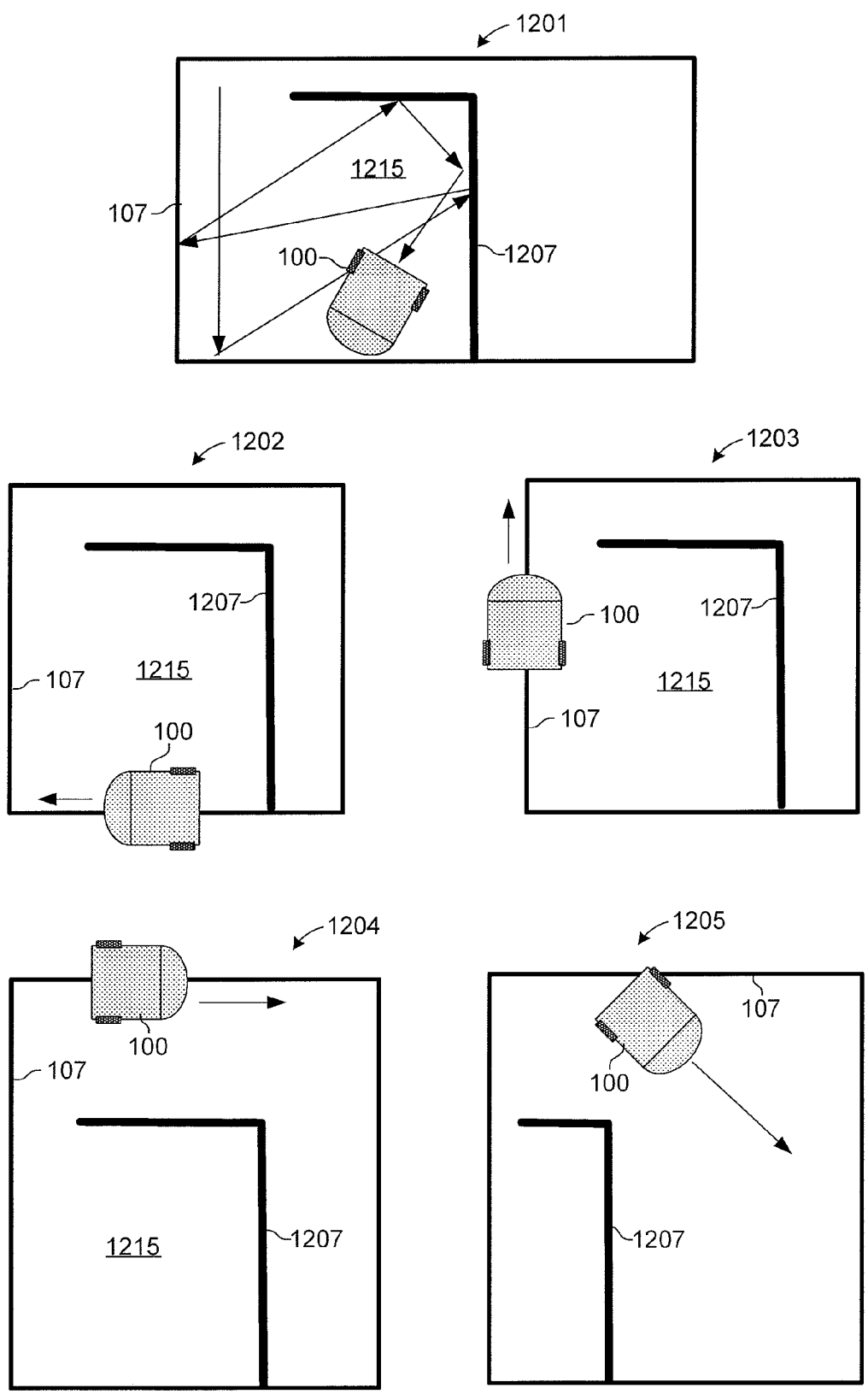
FIG. 12 is an illustrative example of wire-following rescue behavior performed by a robot.
Figure 13:
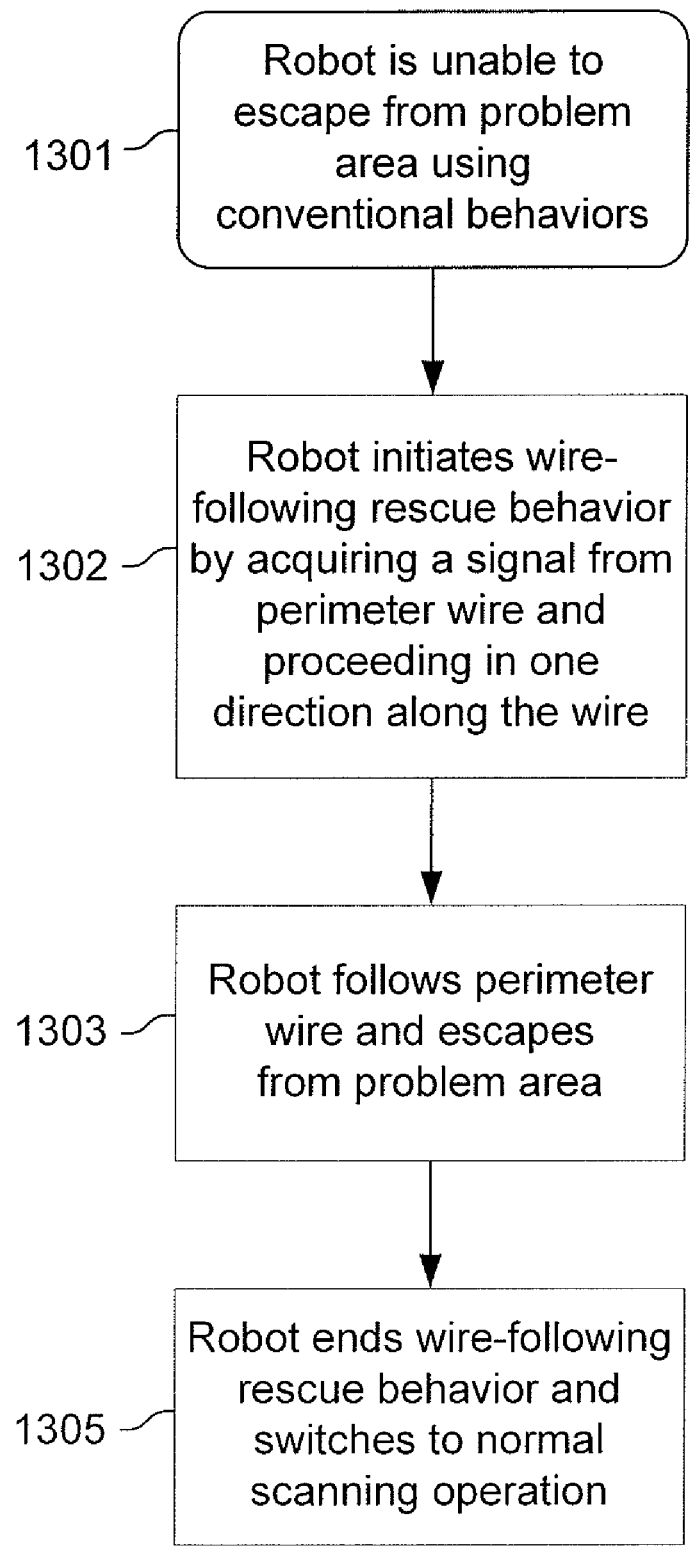
FIG. 13 is a flowchart showing an exemplary set of steps that may be performed by a robot executing wire-following rescue behavior.

FIG. 12 is an illustrative example of wire-following rescue behavior performed by a robot 100. FIG. 13 is a flowchart showing an exemplary set of steps that may be performed by a robot 100 executing wire-following rescue behavior. As shown in FIGS. 12 and 13, in diagram 1201, and at block 1301, initially, robot 100 gets trapped in a problem area 1215, due to an obstruction 1207 such as a partial enclosure. At this point, the robot is scanning normally, but is unable to escape from the problem area 1215 using conventional scanning behaviors. At step 1302 (diagram 1202), the robot initiates wire-following rescue behavior by acquiring a signal from perimeter wire 107 and proceeding in one (arbitrary) direction along the wire.

At step 1303, and as shown in diagrams 1203 and 1204, the robot follows the perimeter wire, and escapes from the problem area 1215. At step 1305 (diagram 1205), the robot ends the wire-following rescue behavior and switches to a normal scanning operation.

Path-Finder Rescue Behavior

Path-finder rescue behavior handles scenarios where a robot 100 has moved into a problem area partially surrounded by an obstacle with an essentially continuous boundary (with no accessible perimeter wire to guide the robot), preventing it from accessing the rest of the work area. In executing path-finder rescue behavior, a sequence of maneuvers (not based on perimeter wire guidance since the perimeter wire 107 is not accessible in the present case) is commenced which causes the robot to follow the perimeter of the obstacle until a clear path out of the problem area is found.

Figure 14A:
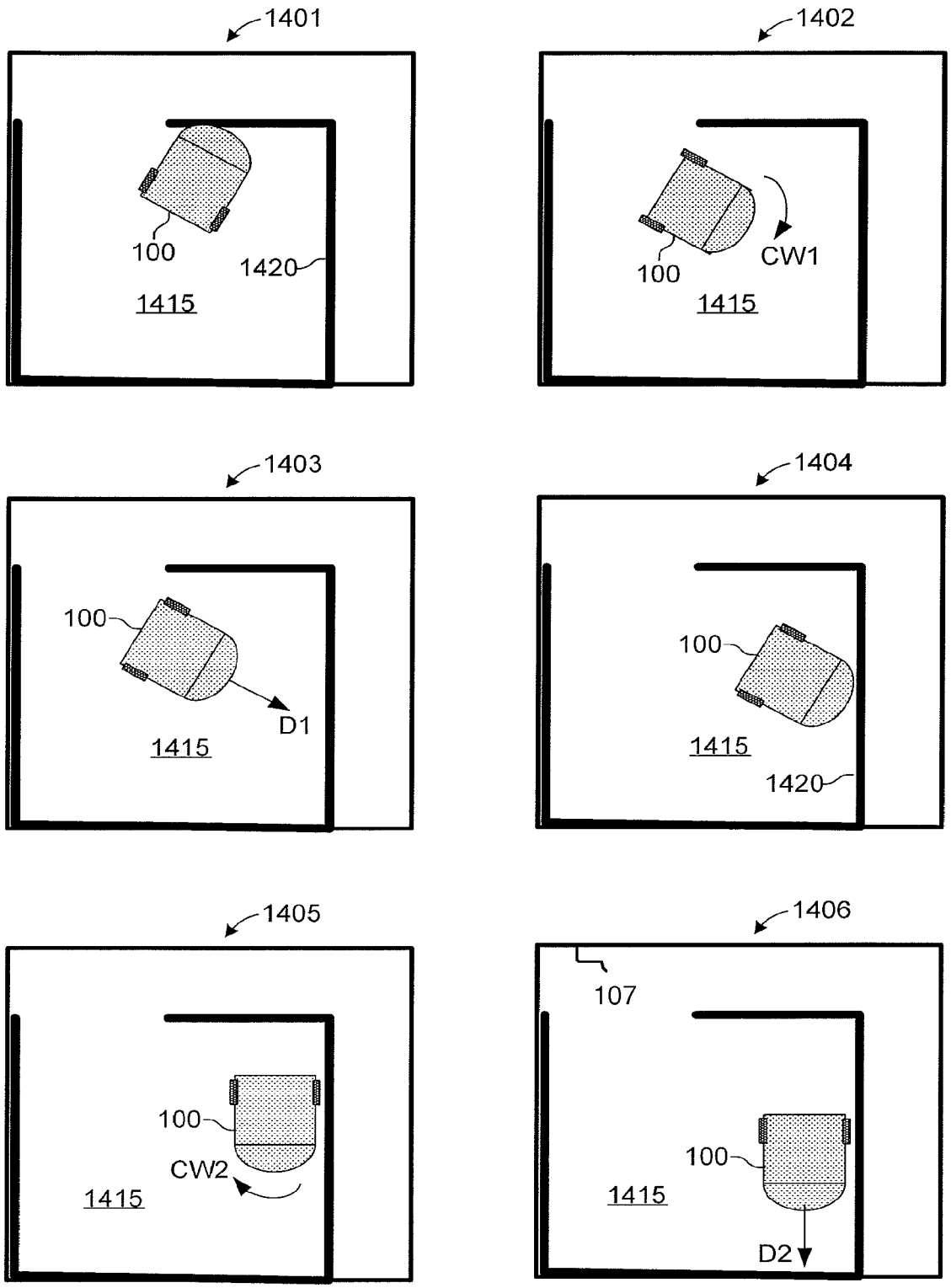
FIGS. 14A and 14B show a set of examples illustrating path-finder rescue behavior performed by a robot.
Figure 14B:
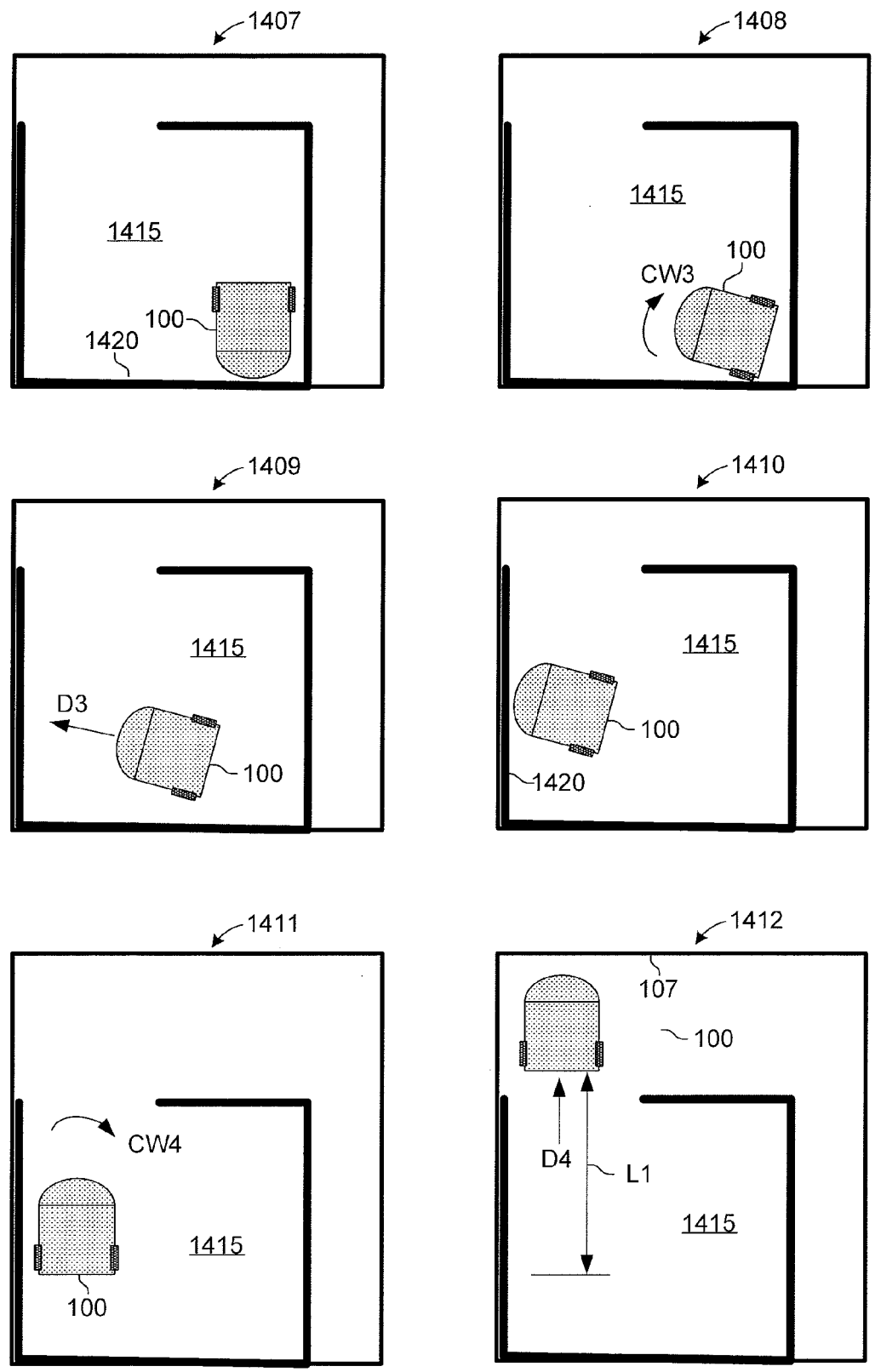
Figure 15:
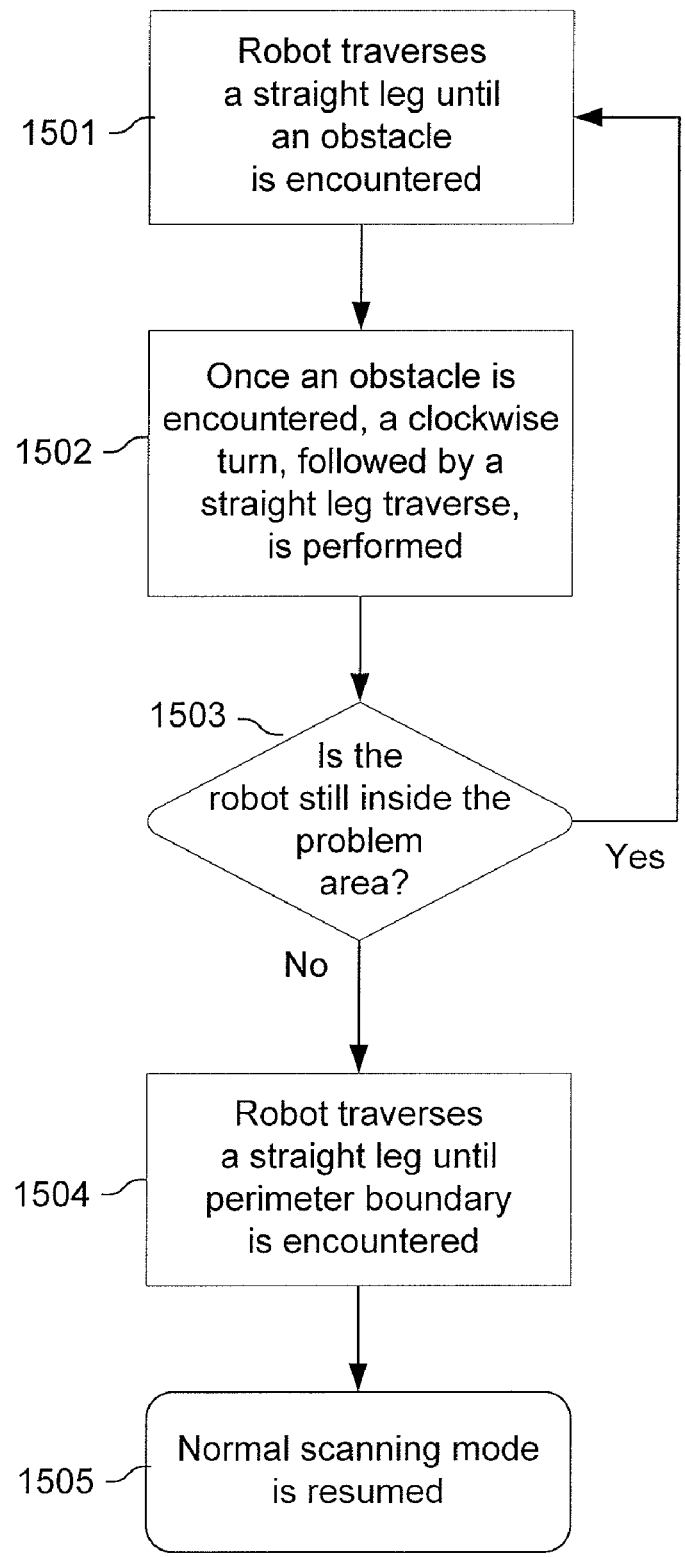
FIG. 15 is a flowchart showing an exemplary set of steps that may be performed by a robot executing path-finder rescue behavior.

FIGS. 14A and 14B show a set of examples illustrating path-finder rescue behavior performed by a robot 100. FIG. 15 is a flowchart showing an exemplary set of steps that may be performed by a robot 100 executing path-finder rescue behavior. In the present scenario, initially, a robot 100 is scanning normally until it gets trapped in a problem area 1415. While still scanning, the robot is unable to escape from the problem area using conventional behaviors. As shown in FIGS. 14A and 14B, in sequentially-ordered diagrams 1401-1412, robot 100 performs path-finder rescue behavior based on the following rules, as shown in FIG. 15.

Initially, at step 1501, a straight leg is traversed by robot 100 until an obstacle is encountered. In the present scenario, the obstacle is a wall 1420, as shown in diagram 1401.

At step 1502, once an obstacle is encountered, a small clockwise turn (for example, 15 degrees) is performed, and robot 100 continues with a straight leg traverse. As shown in diagram 1402, a clockwise turn CW1 is initially made, followed by a straight leg traverse in direction D1, as indicated in diagram 1403. The present example illustrates a clockwise rescue behavior, but the same procedure applies to a rescue where a series of counterclockwise turns are employed. Although smaller angles may be more effective in typical situations, it should be noted that any turn angle less than approximately 180 degrees may be employed with the present method.

A check is then made at step 1503 to determine whether the robot is still inside the problem area 1415. This determination is made by observing that a straight leg is longer than some predetermined value, or that a leg is traversed that is some percentage longer than the average of the past two (or more) legs traversed while in path-finder mode, or the perimeter wire 107 is detected. The above procedure is performed (i.e., steps 1501 and 1502 are executed) until the robot is no longer inside the problem area.

In accordance with the rules set forth in the flowchart of FIG. 15, and as shown in FIGS. 14A and 14B, in the present example the following operations are performed by robot 100 in executing the present path-finder rescue behavior:

Step 1501: The robot encounters an obstacle (wall 1420), as indicated in diagram 1404;

Step 1502: a clockwise turn CW2 is made (diagram 1405), and a straight leg traverse in direction D2 is then made (diagram 1406);

Step 1501: the robot again encounters wall 1420 (diagram 1407);

Step 1502: a clockwise turn CW3 is made (diagram 1408), and a straight leg traverse in direction D3 is made (diagram 1409);

Step 1501: the robot encounters wall 1420 (diagram 1410);

Step 1502: a clockwise turn CW4 is made (diagram 1411), and a straight leg traverse in direction D4 is made (diagram 1412); and Step 1503: the robot then travels a distance L1, which is longer than a minimum predetermined distance, so a determination is made that the robot has extricated itself from inside the problem area 1415.

At step 1504, the robot then traverses a straight leg until perimeter boundary is encountered. When the robot detects a perimeter boundary (via a perimeter wire 107) at step 1505, path-finder rescue behavior is terminated and normal scanning mode is resumed.

In this document, references are made to directions, such as left, right, front, rear, clockwise, counterclockwise, etc. These directional references are exemplary, to show the disclosed subject matter in a typical orientation, and are in no way limiting. While preferred embodiments of the disclosed subject matter have been described, so as to enable one of skill in the art to practice the disclosed subject matter, the preceding description is intended to be exemplary only, and should not be used to limit the scope of the disclosure, which should be determined by reference to the following claims.

What is claimed is:

1. A method for automatically scheduling and optimizing operation of a mobile lawn mowing robot capable of recording data as it operates and of performing autonomously a multiplicity of individual mowing sessions, comprising the steps of:

(a) determining a total lawn area to be mowed in such a multiplicity of mowing sessions by operating the robot to traverse the lawn while performing a scanning operation that automatically calculates said total lawn area to be mowed from data recorded as the robot traverses the lawn;

(b) automatically calculating the number of mowing sessions required to mow the total lawn area in accordance with the known maximum size of an area that can be mowed by the robot per an individual mowing session and said total lawn area to be mowed;

(c) automatically distributing, over a specific time interval, the number of mowing sessions so calculated, whereby a mowing schedule is established;

(d) operating the robot to perform in accordance with the mowing schedule so established; and (e) optimizing the lawn mowing performance of the robot during an individual mowing session by utilizing information derived from data recorded during the individual mowing session.

2. The method of claim 1, wherein the total lawn area to be mowed is determined by operating the robot to follow the lawn perimeter to determine a polygonal area.

3. The method of claim 1, wherein the total lawn area to be mowed is determined by:

(a) operating the robot to perform an autonomous scanning operation to determine the length of an average leg traversed by the robot after multiple traverses across the lawn; and (b) calculating a value equal to two times the square of the length of an average leg.

4. The method of claim 1, wherein said mowing sessions are scheduled in response to information determined during a mowing session.

5. The method of claim 1, wherein, during a mowing session, the robot is operated to monitor electric current drawn by a motor that rotates a mowing blade and thereby determine lawn height from resistance on the blade as a function of the electric current, and, in accordance with such determination, to cause the mowing schedule to be modified to accommodate the lawn height as so determined.

6. The method of claim 1, wherein the length of an individual mowing session is optimized by operating the robot utilizing information obtained from a charging station prior to the mowing session.

7. The method of claim 1, wherein the mowing schedule is automatically adapted in accordance with calendar information, such that the number of mowing sessions in a given period of time is increased or decreased in accordance with the present date.

8. The method of claim 1, wherein data input from an environmental sensor is used to determine the rate of lawn growing, wherein the robot mowing schedule is automatically adjusted accordingly.

9. The method of claim 8, wherein the environmental sensor is selected from the group consisting of a wet grass sensor, a temperature sensor, a rain sensor, and a humidity sensor.

10. A method for automatically scheduling and optimizing operation of a mobile lawn mowing robot capable of recording data as it operates and of performing autonomously a multiplicity of individual mowing sessions, comprising the steps of:

(a) determining a total lawn area to be mowed in such a multiplicity of mowing sessions;

(b) automatically calculating the number of mowing sessions required to mow the total lawn area in accordance with the known maximum size of an area that can be mowed by the robot per an individual mowing session and said total lawn area to be mowed;

(c) automatically distributing, over an established time interval, the number of mowing sessions so calculated, whereby a mowing schedule is established;

(d) operating the robot to perform in accordance with the mowing schedule so established; and (e) optimizing the lawn mowing performance of the robot during an individual mowing session by utilizing information derived from data recorded during the individual mowing session.

11. The method of claim 10, wherein the total lawn area to be mowed is determined from data entered by a user of the robot.

12. A method for automatically scheduling operation of a mobile lawn mowing robot capable of recording data as it operates and of performing autonomously a multiplicity of individual mowing sessions, comprising the steps of:

(a) determining a total lawn area to be mowed in such a multiplicity of mowing sessions by operating the robot to traverse the lawn while performing a scanning operation that automatically calculates said total lawn area to be mowed from data recorded as the robot traverses the lawn;

(b) automatically calculating the number of mowing sessions required to mow the total lawn area in accordance with the known maximum size of an area that can be mowed by the robot per an individual mowing session and said total lawn area to be mowed;

(c) automatically distributing, over an established time interval, the number of mowing sessions so calculated, whereby a mowing schedule is established; and (d) operating the robot to perform in accordance with the mowing schedule so established.

13. The method of claim 12, wherein the total lawn area to be mowed is determined by operating the robot to follow the lawn perimeter to determine a polygonal area.

14. The method of claim 12, wherein the total lawn area to be mowed is determined by:

(a) operating the robot to perform an autonomous scanning operation to determine the length of an average leg traversed by the robot after multiple traverses across the lawn; and (b) calculating a value equal to two times the square of the length of an average leg.

15. The method of claim 12, wherein, during a mowing session, the robot is operated to monitor electric current drawn by a motor that rotates a mowing blade and thereby determine lawn height from resistance on the blade as a function of the electric current, and, in accordance with such determination, to cause the mowing schedule to be modified to accommodate the lawn height as so determined.

16. The method of claim 12, wherein the length of an individual mowing session is optimized by operating the robot utilizing information obtained from a charging station prior to the mowing session.

17. The method of claim 12, wherein the mowing schedule is automatically adapted in accordance with calendar information, such that the number of mowing sessions in a given period of time is increased or decreased in accordance with the present date.

18. The method of claim 12, wherein data input from an environmental sensor is used to determine the rate of lawn growing, wherein the robot mowing schedule is automatically adjusted accordingly.

19. The method of claim 18, wherein the environmental sensor is selected from the group consisting of a wet grass sensor, a temperature sensor, a rain sensor, and a humidity sensor.

* * * * *